(12) United States Patent
O'Brien et al.

(10) Patent No.: US 8,445,552 B2
(45) Date of Patent: May 21, 2013

(54) SOLID SURFACE SHEETS CONTAINING POST-CONSUMER RECYCLED MATERIALS AND METHODS OF MAKING SAME

(75) Inventors: Kevin O'Brien, Cincinnati, OH (US); Dave Swenson, Middletown, OH (US)

(73) Assignee: The Diller Corporation, Cincinnati, OH (US)

( * ) Notice: Subject to any disclaimer, the term of this patent is extended or adjusted under 35 U.S.C. 154(b) by 176 days.

(21) Appl. No.: 12/957,456

(22) Filed: Dec. 1, 2010

(65) Prior Publication Data

US 2012/0142843 A1    Jun. 7, 2012

(51) Int. Cl.
*C08J 11/04* (2006.01)

(52) U.S. Cl.
USPC ............. 521/40; 521/40.5; 521/48; 428/43; 428/98; 428/147; 428/323; 428/328; 264/140; 264/160; 524/437; 524/502; 524/523

(58) Field of Classification Search
USPC .... 521/40–49.8; 524/437, 502, 523; 264/138, 264/140, 160; 428/43, 44, 98, 137, 147, 323, 428/325, 326, 327, 328, 411.1
See application file for complete search history.

(56) References Cited

U.S. PATENT DOCUMENTS

| | | | |
|---|---|---|---|
| 5,043,377 A | 8/1991 | Nogi et al. | |
| 5,244,941 A | 9/1993 | Bruckbauer et al. | |
| 5,286,290 A | 2/1994 | Risley | |
| 5,588,599 A | 12/1996 | Novak | |
| 6,132,820 A | 10/2000 | Callahan | |
| 6,194,051 B1 | 2/2001 | Gagas et al. | |
| 6,696,509 B2 | 2/2004 | Risley | |
| 6,747,075 B2 | 6/2004 | Nardi et al. | |
| 7,198,833 B1 | 4/2007 | West | |
| 2002/0055006 A1 * | 5/2002 | Vogel et al. | 428/520 |
| 2006/0046034 A1 | 3/2006 | Schober | |
| 2006/0170130 A1 | 8/2006 | Sult | |
| 2008/0029917 A1 | 2/2008 | Maldas et al. | |

FOREIGN PATENT DOCUMENTS

| | | |
|---|---|---|
| BR | PI0 804 422 A | 7/2010 |
| EP | 0 992 530 A1 | 4/2000 |
| WO | 9709372 A1 | 3/1997 |

OTHER PUBLICATIONS

Bradley Corporation "Terron RE Recycled Solid Surface New!", http://www.bradleycorp.com/products/fixtures/terreon_RE.jsp, 2009.
Bradley Corporation "Frequency Lavatory System", http://www.bradleycorp.com/products/fixtures/frqlavysystems/viewproduct.jsp?pgid=1215, 2009.
Petrostone Industries, Inc., Armstone, "Recycled Colors", webmaster@armstone.com, Oct. 25, 2004.
Avonite Surfaces, "Recycled Products", http://www.avonitesurfaces.com/products/recycled.asp, 2009.
Notification of Transmittal of the International Search Report and the Written Opinion of the International Searching Authority pertaining to International application No. PCT/US2011/062803 dated Apr. 12, 2012.

* cited by examiner

*Primary Examiner* — Frances Tischler
(74) *Attorney, Agent, or Firm* — Dinsmore & Shohl LLP

(57) ABSTRACT

Embodiments of the present invention are directed to solid surface sheets and methods of making solid surface sheets, wherein the method comprises dissolving post-consumer recycled polystyrene in a first liquid resin precursor to form a blend, solidifying the blend via curing, grinding the solidified blend into recycled particles, adding the recycled particles and filler into a second liquid resin precursor to produce a solid surface precursor, and molding and curing the solid surface precursor to produce the solid surface sheet.

17 Claims, No Drawings

SOLID SURFACE SHEETS CONTAINING POST-CONSUMER RECYCLED MATERIALS AND METHODS OF MAKING SAME

BACKGROUND

The present invention generally relates to decorative solid surface materials, and specifically relates to decorative solid surface sheets comprising post-consumer recycled materials, such as recycled polystyrene, or pre-consumer materials, such as byproducts produced from the production of the solid surface material.

SUMMARY

In one embodiment, a method of making solid surface sheets is provided. The method comprises dissolving post-consumer recycled polystyrene in a first liquid resin precursor to form a blend, solidifying the blend via curing, grinding the solidified blend into recycled particles, adding the recycled particles and filler into a second liquid resin precursor to produce a solid surface precursor, and molding and curing the solid surface precursor to produce the solid surface sheet.

In another embodiment, a solid surface sheet is provided. The solid surface sheet comprises filler, polyester resin, and recycled particles comprising a blend of post-consumer recycled polystyrene and polymeric resin.

The features and advantages of the present invention will become apparent from the following description.

DETAILED DESCRIPTION

Embodiments of the present invention are directed to solid surface sheets and methods of making solid surface sheets, specifically solid surface materials that utilize post-consumer recycled material (e.g., general purpose polystyrene ("GPPS")). The post-consumer recycled material may be any product discarded by the consumer or end user, for example, any foamed polystyrene product such as a cup, packing peanuts, or any other product comprising recyclable polystyrene.

The solid surface sheets may also comprise pre-consumer recycled material (dust and small particulates) comprising recycled byproducts of the manufacturing process. Typically, these byproduct particles are ground and sized before being re-added to the process of making solid surface sheets; however, it is contemplated that the byproduct particles may be directly added back into the process. By incorporating the recycled materials into the solid surface sheets, the solid surface sheets may receive Leadership in Energy and Environmental Design ("LEED") credits. The LEED is the internationally recognized green building certification system.

The solid surface sheets may comprise polymeric resin (e.g., a polyester resin), and recycled particles comprising a blend of post-consumer recycled material of polymeric resin. In one embodiment, the blend is a homogeneous blend. As used herein, "recycled particles" refer to the blend of recycled material and polymeric resin produced in accordance with the present invention. As will be described below, post-consumer and pre-consumer recycled materials are dissolved in a liquid resin precursor to produce the recycled particles, and then these recycled particles are mixed with further polymeric resin as well as any additional fillers and additives to produce the solid surface sheets.

In addition to the post-consumer recycled material, the solid surface sheet may also comprise the pre-consumer recycled particulates as described above. As will be described below, the post-consumer recycled material typically is dissolved before being added into the solid surface sheet; however, it is not necessary to dissolve the pre-consumer recycled material before adding into the solid surface sheet.

For the recycled particles, the blend is an insoluble structure produced by the polymerization of the post-consumer recycled material and a liquid resin precursor. Liquid resin precursors, which are used in the dissolution of the pre-consumer recycled material and the post-consumer recycled material and the polymerization with the recycled material therewith, may include various components as long as they can be formed into a solid surface material by curing as described in the methods below. Preferred free radical, heat curable resins particularly useful in the practice of the present invention are thermosetting unsaturated polyester resins and thermosetting polyacrylate resins, and combinations thereof. Examples of useful unsaturated polyester resins are reaction products of unsaturated dicarboxylic acids, or unsaturated dicarboxylic acids and saturated dicarboxylic acids, with glycols, such as maleic acid, phthalic acid and dipropylene glycol monomers respectively. Examples of useful polyacrylate resins include various kinds of conventional acrylic group monomers, acrylic group partial polymers, vinyl monomers for copolymerization other than acrylic group monomers, or oligomers. The above reactive monomers are not considered exhaustive; however, the use of methyl methacrylate monomer is preferred. Additional useful thermosettable polymers include epoxies, urethanes, acrylo-urethanes, melamines and combinations thereof.

Noting that styrene monomer is a useful monomeric crosslinker, the present inventors recognized that the post-consumer recycled material (e.g., general purpose polystyrene ("GPPS")) could be utilized as a crosslinker. As a result, the present inventors recognized that using post-consumer recycled polystyrene is beneficial, as it can be broken down into styrene monomers that are then used as a crosslinker. While it is contemplated that the polystyrene is fully broken down into styrene monomer, in specific embodiments, the polystyrene is typically not fully broken down into styrene monomers. Consequently, utilizing post-consumer recycled polystyrene is not only environmentally beneficial, but is useful in the polymerization process that yields the recycled particles of the solid surface material.

Without being limited to these components, the embodiments of the present invention may utilize methyl methacrylate monomer as the liquid resin precursor used to dissolve the pre-consumer recycled material and the post-consumer recycled material. After the recycled solid particles are produced, one or more embodiments of the present invention may utilize a polyester resin for mixing with the recycled particles in the production of the solid surface sheet. The combination of the methyl methacrylate resin and the polyester resin is beneficial, because the polyester resin tends to impart toughness to the solid surface sheet and the methyl methacrylate resin tends to impart flexibility for the produced recycled particles.

While the solid surface material can be unfilled, it is preferred in some embodiments to include filler material. Suitable fillers include, for example, aluminum trihydrate, calcium carbonate, titanium dioxide, barium sulfate, magnesium hydroxide, and talc, which as examples, are not considered to be exhaustive and not intended to limit the scope of the claimed invention. In exemplary embodiments, the filler is aluminum trihydrate.

It is also known to include in solid surface materials other optional additives such as polymeric particulates, pearlescent particles, pigments, dyes, flame retardant agents, release agents, fluidizing agents, viscosity control agents, curing agents, antioxidants, toughening agents (e.g., abrasion resistant materials like Sartomer® SR399 dipentaerythritol pentaacrylate oligomer), catalysts, and the like as is well known to those of ordinary skill in the art. For example, additional pigments having differing or contrasting colors may also be added to the composition. The inclusion of minor amounts of any or all of these additives is contemplated. Additionally, catalysts, such as methyl ethyl ketone peroxide (MEKP), and other catalysts may also be added to the mixture. The catalyst used and the concentration of the catalyst is matched to the particular polymer or polymers, and processing conditions being used.

Various amounts are contemplated for the components of the recycled particles. The recycled particles may comprise up to about 55% by weight pre-consumer recycled material and post-consumer recycled material, or from about 25 to about 45% by weight pre-consumer recycled material and post-consumer recycled material. The recycled particles may comprise from about 20 to about 60% by weight polymeric resin (for example, methyl methacrylate), or from about 25 to about 45% by weight polymeric resin. The recycled particles may comprise from about 20% to about 80% by weight filler (e.g., aluminum trihydrate), or from about 30% to about 50% by weight filler. The remainder of the recycled particles, for example, up to about 10% by weight additional additives, such as catalysts, and pigments.

The solid surface sheets, which incorporate the recycled particles, may comprise up to about 55%, or up to about 35 to about 50% by weight recycled particles. Considering that much of the recycled particles are comprised of polymeric resin, about 20% by weight of the solid surface material is then comprised of pre-consumer and post-consumer recycled material, or about 15 to about 20% by weight of pre-consumer and post-consumer recycled material. Without being bound by theory, utilizing more than 20% of the pre-consumer and post-consumer recycled material may be detrimental to the fire resistance and strength of the solid surface material. In further embodiments, the solid surface sheet may comprise from above 0 to about 10% by weight, or from above 0 to about 5% by weight of the post-consumer recycled material (e.g., polystyrene). Additionally, the solid surface sheet may comprise from above 0 to about 15% by weight, or from above 10 to about 15% by weight of the pre-consumer recycled material.

The solid surface sheet may also comprise from about 20 to about 30% by weight of polyester resin, or from about 24 to about 28% by weight of polyester resin. The filler (e.g., the aluminum trihydrate) may be included in both the recycled particles and in the solid surface sheet separate from the recycled particles. In one embodiment, the solid surface may comprise from about 40 to about 70% by weight or from 50 to about 60% by weight aluminum trihydrate, wherein up to about 50% is in the recycled particles and from about 20 to about 30% of the aluminum trihydrate is present in the solid surface sheet separate from the recycled particles. The remainder of the solid surface sheet may comprise, for example, up to about 10% by weight additional additives, such as catalysts, and pigments. In one embodiment, the ratio by weight of aluminum trihydrate and polyester resin to pre-consumer and post-consumer recycled material is from about 1:5 to 1 to about 1:1.

Turning to the method of producing the solid surface sheet, the method of making the solid surface sheets comprises the steps of dissolving post-consumer recycled material in a liquid polymeric resin precursor (e.g., methyl methacrylate) to form a blend, solidifying the blend comprising the post-consumer recycled material via curing, grinding the solidified blend into recycled particles, and mixing the recycled particles and filler with a polyester resin to produce a solid surface sheet.

In one exemplary embodiment for the production of the recycled particles, post-consumer recycled material (e.g., GPPS) and pre-consumer fines are added to a liquid polymeric resin precursor (methyl methacrylate ("MMA") oligomer) in a suitable mixing vessel and agitated until fully dissolved into a blend having a syrup consistency. The "syrup" commonly refers to the uncured liquid state of a polymer, where said polymer is present in solution with a suitable crosslinking monomer. Any suitable mixing method may be used, including a dispersing-type blade mixer, kneading mixer, screw mixer, or double planetary mixer. At which point, additional additives and fillers such as aluminum trihydrate, Sartomer® SR399 oligomer, pigments, cobalt and more MMA may be added to the GPPS-MMA syrup and blended to a thin paste with a viscosity of approximately 60 kCPS. A catalyst (e.g., a methyl ethyl ketone peroxide (MEKP)) catalyst may then be added to the mixture.

The mixture is dispensed from the mixing vessel and cast into a suitable open mold which is sized to provide a sheet of solid surface material having the desired length, width, and thickness dimensions. In specific embodiment, the mixture present in the mold may be incorporated into a vacuum chamber sized to be able to completely contain the mold, so that the molded mixture may be cured under vacuum pressure to produce a hard gelled structure. In an exemplary embodiment, the molded mixture is placed under 24 inches Hg vacuum pressure and hard-gelled at a curing temperature of about 150 to 170° F.

Once the blend of pre-consumer and post-consumer recycled materials have solidified, it is de-molded and placed in a "post-cure" oven to complete the polymerization and curing process. For example, the sheet may be demolded, and post-cured. Post-curing is typically carried out at temperatures of from about 150 to about 200° F. for a period of from about 1 to about 4 hours, depending on the size, thickness, and composition. In a preferred embodiment, post curing is conducted at 190° F. Preferably, heating of the post-cure oven is accomplished by re-circulation of hot air over the curing material. Optionally, cooling may be conducted, typically by gradually reducing the temperature of that recirculating oven air. In one exemplary embodiment, cooling occurs at a rate of approximately 1° F. per minute, such that the solidified mixture is cooled down to at least 115° F. (46° C.) before removal from the oven. To produce the recycled particles, the solidified homogenous blend comprising pre-consumer and post-consumer recycled material is then ground via milling, grinding, or any other suitable technique to produce the recycled particles.

Upon production of the recycled particles, the recycled particles are then added to a polyester resin with filler (e.g., aluminum trihydrate), and optional ingredients such as polymeric resin (e.g., MMA), pigments, and catalysts (e.g., MEKP catalyst). Like the production of the recycled particles, the mixture is poured into molds and cured in a vacuum chamber to produce a hard-gelled solid surface precursor. The solid surface precursor is then demolded, and post-cured, for example, at 175° F. for 3 hours. The resulting solid surface sheets may then be sanded, polished, and stacked for storage. Accordingly, the final product is a solid surface material with particles that contain post-consumer recycled material (polystyrene) and pre-consumer recycled fines.

It is further noted that terms like "preferably," "generally", "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A solid surface sheet comprising:
   a filler;
   a polyester resin; and
   recycled particles comprising a crosslinked, polymerized blend produced from post-consumer recycled polystyrene dissolved in a first liquid resin precursor is selected from the group consisting of acrylic group monomers and oligomers, wherein the post-consumer recycled polystyrene breaks down to a styrene monomer crosslinker upon dissolution in the first liquid resin monomer precursor.

2. The solid surface sheet of claim 1 wherein the blend is a homogeneous blend.

3. The solid surface sheet of claim 2 wherein the homogeneous blend defines an insoluble structure produced by polymerization of the post-consumer recycled polystyrene and the first liquid resin precursor.

4. The solid surface sheet of claim 1 wherein the first liquid resin precursor comprises methyl methyacrylate oligomer.

5. The solid surface sheet of claim 1 wherein the filler is aluminum trihydrate.

6. The solid surface sheet of claim 1 wherein the recycled particles further comprises pre-consumer recycled particulates.

7. The solid surface sheet of claim 6 wherein the ratio by weight of filler and polyester resin to pre-consumer recycled particulates and post-consumer recycled polystyrene is from about 1:5 to about 1:1.

8. The solid surface sheet of claim 1 wherein the recycled particles comprise about 45 to about 55% post-consumer recycled polystyrene and first liquid resin precursor.

9. The solid surface sheet of claim 6 wherein the solid surface sheet comprises about 15 to about 20% by weight in total of pre-consumer recycled particulates and post-consumer recycled polystyrene.

10. The solid surface sheet of claim 1 wherein the recycled particles further comprises aluminum trihydrate.

11. The solid surface sheet of claim 1 wherein the solid surface sheet comprises from about 20 to about 30% by weight of polyester resin.

12. A solid surface sheet comprising:
    a filler comprising aluminum trihydrate;
    a polyester resin; and
    recycled particles comprising a crosslinked, polymerized homogeneous blend produced from post-consumer recycled polystyrene dissolved in a first liquid resin precursor, wherein the first liquid resin precursor comprises methyl methyacrylate oligomer, wherein the post-consumer recycled polystyrene breaks down to a styrene monomer crosslinker upon dissolution in the first liquid resin precursor.

13. The solid surface sheet of claim 12 wherein the recycled particles further comprises pre-consumer recycled particulates.

14. The solid surface sheet of claim 13 wherein the solid surface sheet comprises about 15 to about 20% by weight in total of pre-consumer recycled particulates and post-consumer recycled polystyrene.

15. The solid surface sheet of claim 13 wherein the ratio by weight of filler and polyester resin to pre-consumer recycled particulates and post-consumer recycled polystyrene is from about 1:5 to about 1:1.

16. The solid surface sheet of claim 12 wherein the recycled particles comprise about 45 to about 55% post-consumer recycled polystyrene and first liquid resin monomer precursor.

17. The solid surface sheet of claim 12 wherein the solid surface sheet comprises from about 20 to about 30% by weight of polyester resin.

* * * * *